United States Patent
Hao et al.

(10) Patent No.: US 10,604,884 B2
(45) Date of Patent: Mar. 31, 2020

(54) WASHING MACHINE CONTROL METHOD AND WASHING MACHINE

(71) Applicant: QINGDAO HAIER WASHING MACHINE CO., LTD., Qingdao, Shandong (CN)

(72) Inventors: Shilong Hao, Qingdao (CN); Chunxu Wang, Qingdao (CN); Jingjing Zhang, Qingdao (CN); Yimin Li, Qingdao (CN); Yongxin Wang, Qingdao (CN); Haitao Hu, Qingdao (CN); Chunfeng Lao, Qingdao (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 137 days.

(21) Appl. No.: 15/562,984

(22) PCT Filed: Mar. 30, 2016

(86) PCT No.: PCT/CN2016/077885
§ 371 (c)(1),
(2) Date: Sep. 29, 2017

(87) PCT Pub. No.: WO2016/155629
PCT Pub. Date: Oct. 6, 2016

(65) Prior Publication Data
US 2018/0112346 A1     Apr. 26, 2018

(30) Foreign Application Priority Data

Mar. 30, 2015 (CN) .......................... 2015 1 0144217

(51) Int. Cl.
| | | |
|---|---|---|
| *B08B 3/04* | (2006.01) | |
| *B08B 5/02* | (2006.01) | |
| *B08B 7/04* | (2006.01) | |
| *D06F 39/00* | (2020.01) | |
| *D06F 39/08* | (2006.01) | |

(Continued)

(52) U.S. Cl.
CPC ................ *D06F 39/10* (2013.01); *B08B 3/04* (2013.01); *B08B 5/02* (2013.01); *B08B 7/04* (2013.01);

(Continued)

(58) Field of Classification Search
CPC .... B08B 3/04; B08B 5/02; B08B 7/04; D06F 33/02; D06F 39/006; D06F 39/08; D06F 39/083; D06F 39/085; D06F 39/10; D06F 2226/00

(Continued)

(56) References Cited

U.S. PATENT DOCUMENTS

2012/0167931 A1*  7/2012  Park .................... A47L 15/4223
                                                            134/186
2014/0298590 A1   10/2014  Fulmer et al.

FOREIGN PATENT DOCUMENTS

| CN | 202860901 | 4/2013 |
| CN | 204000331 | 12/2014 |

(Continued)

OTHER PUBLICATIONS

Extended European Search Report, European Patent Application 16771384.1, dated Nov. 6, 2018.

(Continued)

*Primary Examiner* — Levon J Shahinian
(74) *Attorney, Agent, or Firm* — Greenberg Traurig

(57) ABSTRACT

A washing machine including: a first drainage pump arranged between a washing drum and a filter membrane assembly. The first drainage pump pumps water in the washing drum into the filter membrane assembly for filtration and ensures that a water level in a water inlet cavity of the filter membrane assembly is not higher than a lower edge of a sewage outlet, so as to prevent reduce of the amount of washing water due to drainage of excessive washing water/rinsing water. Since the first drainage pump is a low-lift water pump, water in the filter membrane assembly moves continuously during filtration, so as to scour pollutants on a surface of a filter membrane/membrane filament, reduce an accumulation degree of the pollutants, effectively prevent blockage and achieve low noise.

5 Claims, 1 Drawing Sheet

(51) Int. Cl.
    *D06F 39/10*     (2006.01)
    *D06F 33/02*     (2006.01)

(52) U.S. Cl.
    CPC ............ *D06F 39/08* (2013.01); *D06F 39/083* (2013.01); *D06F 33/02* (2013.01); *D06F 39/006* (2013.01); *D06F 39/085* (2013.01); *D06F 2226/00* (2013.01)

(58) Field of Classification Search
    USPC .................................................. 68/18 F, 208
    See application file for complete search history.

(56) References Cited

FOREIGN PATENT DOCUMENTS

| | | |
|---|---|---|
| CN | 104342887 | 2/2015 |
| CN | 104372578 | 2/2015 |
| CN | 204138953 | 2/2015 |
| CN | 204530230 | 8/2015 |
| CN | 105350266 | 2/2016 |
| CN | 105350267 | 2/2016 |
| CN | 105463759 | 4/2016 |
| EP | 2175062 | 4/2010 |
| JP | 06047189 | 2/1994 |
| JP | 11-276794 | 10/1999 |
| JP | 2000189693 | 7/2000 |
| KR | 10-1996-0004638 | 2/1996 |
| WO | 2014079253 | 5/2014 |
| WO | 2015010526 | 1/2015 |

OTHER PUBLICATIONS

International Patent Application No. PCT/CN2016/077885, International Search Report, dated Jun. 29, 2016.

\* cited by examiner

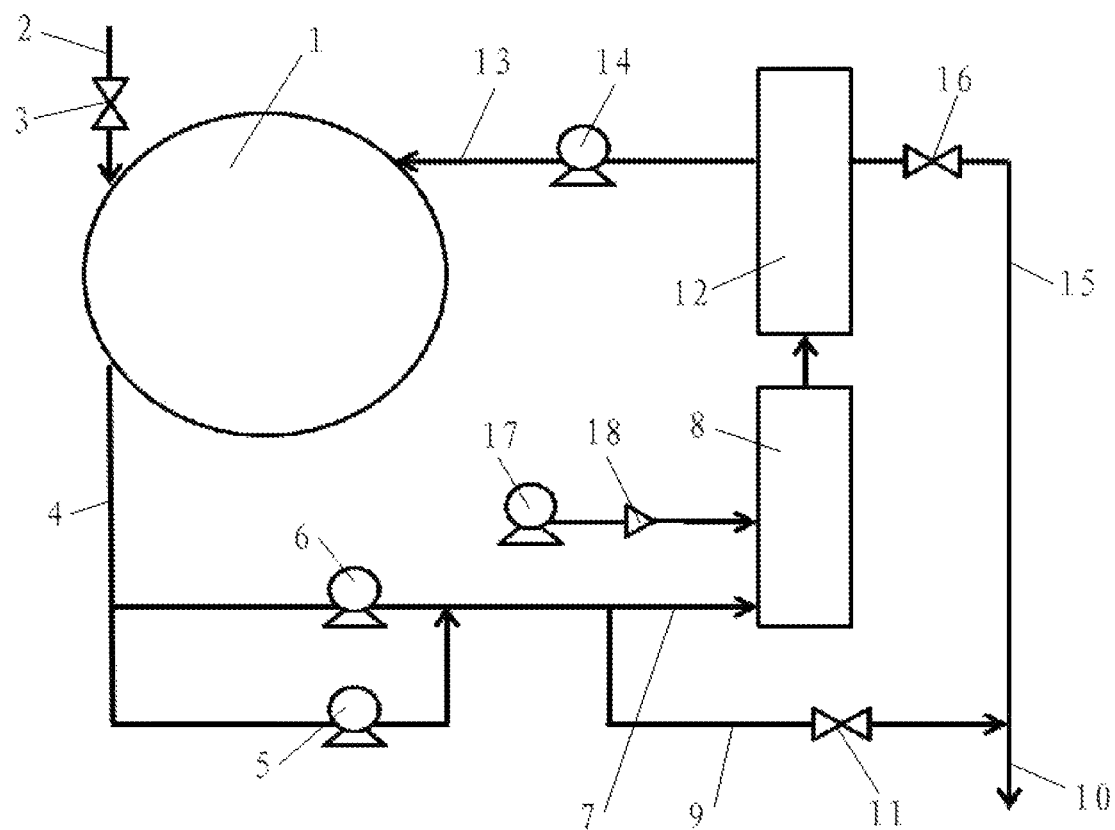

WASHING MACHINE CONTROL METHOD AND WASHING MACHINE

The present application is a national phase application under 35 U.S.C. § 371 of International Patent Application PCT/CN2016/077885, filed on Mar. 30, 2016, entitled "Washing Machine Control Method and Washing Machine", which claims priority to Chinese Patent Application No. 201510144217.4, filed on Mar. 30, 2015, the entire disclosures of which applications are hereby incorporated herein by reference.

TECHNICAL FIELD

The present disclosure relates to the technical field of washing devices, for example, relates to a control method of a washing machine and a washing machine using the control method.

BACKGROUND

A washing routine when a washing machine washes clothes usually includes water feeding, washing-spin drying-draining, repeated rinsing-spin drying-draining, and the like, wherein washing and rinsing need to consume a large amount of clear water. The washing water or rinsing water is discharged from the washing machine by a drainage pipe. The water consumption is relatively large in an entire washing process, thereby greatly wasting water resources.

The following treatment methods can be adopted to purify washing sewage:

1. the rinsing water is collected into a water storage tank, is simply filtered by a filter mesh, and then is applied to next washing;
2. the sewage is purified by a reverse osmosis filter; and
3. a large-scale water treatment apparatus or an ozone generator, an electrolyser and other accessory devices are used for purifying the washing water.

The above methods for purifying the washing sewage have the following disadvantages:

1. the water storage tank and the filter mesh are added and can only simply remove line chips in the sewage, so that effluent water contains many impurities and water quality is not stable;
2. the reverse osmosis filter is used for purifying the sewage, so that a water production rate is low, the amount of water cannot guarantee usage demands of the washing machine, and meanwhile treatment cost is relatively high; and
3. the large-scale water treatment apparatus, the ozone generator, the electrolyser and other accessory devices are used, thereby greatly increasing the treatment cost.

SUMMARY

In order to overcome the above problems, a filter membrane assembly can be adopted to filter washing water and/or rinsing water of a washing machine so as to recycle water resources. However, with the increase of washing times of the washing machine, separated substances and some other impurities may be gradually accumulated on a surface of a filter membrane/membrane filament to cause problems of blockage and pollution of the filter membrane/membrane filament and greatly affect a filtering effect. A solution is that water in the filter membrane assembly is disturbed in a gas-blowing manner while the water is filtered so as to prevent the blockage of the filter membrane/membrane filament. But such a manner may produce loud noise to affect the quality of human life.

In view of the above problems, a novel washing machine and a control method thereof are needed to solve problems in the washing machine such as easy blockage of the filter membrane/membrane filament and the loud noise of the washing machine.

Embodiments of the present disclosure propose a control method of a washing machine capable of effectively preventing the blockage of the filter membrane/membrane filament and having low noise.

Embodiments of the present disclosure further propose a washing machine capable of effectively preventing the blockage of the filter membrane/membrane filament and reducing noise.

On an aspect, embodiments of the present disclosure adopt following technical solutions.

In a control method of a washing machine, the washing machine includes a filter membrane assembly, a water suction pump, a first drainage pump and a gas flow supply apparatus, wherein the filter membrane assembly is configured to filter water discharged from a washing drum of the washing machine and has separated first water inlet cavity and first water filtering cavity; and the first water inlet cavity has a water inlet and a sewage outlet;

the water suction pump is arranged on a water production pipeline of the filter membrane assembly and is configured to suck water in the first water filtering cavity to the water production pipeline, so as to return water filtered by the filter membrane assembly to the washing drum of the washing machine for reuse;

the first drainage pump is arranged on a pipeline between the washing drum and a water inlet of the first water inlet cavity and is configured to pump water in the washing drum into the first water inlet cavity and ensure that a water level in the first water inlet cavity is not higher than a lower edge of the sewage outlet;

the gas flow supply apparatus is configured to perform gas washing to the filter membrane assembly; and the control method includes a circulating water filtering step including: setting the gas flow supply apparatus to be in a closed state, and turning on the first drainage pump and the water suction pump so that water in the washing drum flows into the filter membrane assembly for filtration, and water suction pump sucks water filtered into the first water filtering cavity to the water production pipeline of the filter membrane assembly so as to return water filtered by the filter membrane assembly to the washing drum for reuse.

Optionally, the control method further includes a gas washing and sewage discharging step of the filter membrane assembly including: turning off the first drainage pump and turning on the gas flow supply apparatus, so that the gas flow supply apparatus blows gas to the filter membrane assembly so as to perform gas washing to the filter membrane assembly, and gas and sewage in the first water inlet cavity are discharged through the sewage outlet of the first water inlet cavity.

Optionally, the washing machine further includes a second drainage pump; a lift of the second drainage pump is greater than that of the first drainage pump; the second drainage pump is configured to pump water in the washing drum to a discharge pipeline of the washing machine so as to discharge water to outside of the washing machine, Or, the second drainage pump is configured to pump water in the washing drum to the filter membrane assembly for washing the filter membrane assembly, and discharge water after washing from the discharge pipeline of the washing machine to outside of the washing machine through the sewage outlet of the first water inlet cavity;

the control method further includes a water washing and sewage discharging step of the filter membrane assembly including:

turning on the second drainage pump, so that the second drainage pump pumps water in the washing drum into the filter membrane assembly so as to perform water washing to the filter membrane assembly, and sewage in the first water inlet cavity is discharged through the sewage outlet of the first water inlet cavity.

Optionally, the water washing and sewage discharging step and the gas washing and sewage discharging step of the filter membrane assembly are performed simultaneously; or, the water washing and sewage discharging step is performed after the gas washing and sewage discharging step.

Optionally, the washing machine further includes a pre-filter arranged on an upstream pipeline of the filter membrane assembly; and the control method further includes a gas washing and sewage discharging step and/or a water washing and sewage discharging step of the pre-filter.

Optionally, the gas washing and sewage discharging step of the pre-filter includes: turning off the first drainage pump and turning on the gas flow supply apparatus, so that the gas flow supply apparatus blows gas to the pre-filter so as to perform gas washing to the pre-filter (8), and gas and sewage after gas washing are discharged from the washing machine through the discharge pipeline; and the water washing and sewage discharging step of the pre-filter includes: turning on the second drainage pump, so that the second drainage pump pumps water in the washing drum to the pre-filter so as to perform water washing to the pre-filter, and sewage after water washing is discharged from the washing machine through the discharge pipeline.

On another aspect, embodiments of the present disclosure adopt the following technical solutions.

A washing machine includes:

a filter membrane assembly, which is configured to filter water discharged from a washing drum of the washing machine and having separated first water inlet cavity and first water filtering cavity, wherein the first water inlet cavity has a water inlet and a sewage outlet;

a water suction pump, which is arranged on a water production pipeline of the filter membrane assembly and is configured to suck water in the first water filtering cavity to the water production pipeline, so as to return water filtered by the filter membrane assembly to the washing drum of the washing machine for reuse;

a first drainage pump, which is arranged on a pipeline between the washing drum and a water inlet of the first water inlet cavity and is configured to pump water in the washing drum to the first water inlet cavity and ensure that a water level in the first water inlet cavity is not higher than a lower edge of the sewage outlet; and a second drainage pump, which is arranged in parallel with the first drainage pump, wherein a lift of the second drainage pump is greater than a lift of the first drainage pump; and the second drainage pump is configured to pump water in the washing drum to a discharge pipeline of the washing machine so as to discharge the water to outside of the washing machine, or, the second drainage pump is configured to pump water in the washing drum to the filter membrane assembly for washing the filter membrane assembly, and discharge the water after washing from the discharge pipeline of the washing machine to outside of the washing machine through the sewage outlet of the first water inlet cavity.

Optionally, the washing machine further includes a gas flow supply apparatus, which is configured to perform gas washing to the filter membrane assembly; where the first drainage pump is in an off state when the gas flow supply apparatus is operated.

Optionally, the washing machine further includes a pre-filter, which is arranged on an upstream pipeline of the filter membrane assembly and is configured to filter water from the washing drum before the filter membrane assembly;

the pre-filter is located below the filter membrane assembly; a filter mesh of the pre-filter divides an internal accommodating cavity of the pre-filter into a second water inlet cavity and a second water filtering cavity which is located above the second water inlet cavity; and a gas outlet of the gas flow supply apparatus is connected to the second water inlet cavity.

Optionally, a turbidity sensor is arranged in the washing drum, and is configured to detect turbidity of rinsing water or washing water in the washing drum, filter water in the washing drum when a detected turbidity is less than a preset value; and directly discharge water in the washing drum from the washing machine after use when a detected turbidity is greater than or equal to the preset value.

The first drainage pump is arranged between the washing drum and the filter membrane assembly of the washing machine provided by embodiments of the present disclosure. The first drainage pump pumps the water in the washing drum to the filter membrane assembly for filtration and ensures that the water level in the water inlet cavity of the filter membrane assembly is not higher than the lower edge of the sewage outlet, so as to prevent drainage of excessive washing water/rinsing water to reduce the amount of washing water. Since the first drainage pump is a low-lift water pump, the water in the filter membrane assembly moves continuously during filtration, so as to scour pollutants on the surface of the filter membrane/membrane filament, reduce an accumulation degree of the pollutants, effectively prevent blockage and achieve low noise. In addition, the water surface in the filter membrane assembly continuously fluctuates so that the sewage in the water inlet cavity of the filter membrane assembly can continuously overflow from the sewage outlet and is discharged.

BRIEF DESCRIPTION OF DRAWINGS

FIG. 1 is a schematic structural diagram illustrating a washing machine provided by an embodiment I of the present disclosure.

In the FIGURE, 1: Washing drum; 2: Water inlet pipe; 3: First valve; 4: Drainage pipe; 5: First drainage pump; 6: Second drainage pump; 7: First branch path; 8: Pre-filter; 9: Second branch path; 10: Discharge pipeline; 11: Fourth valve; 12: Filter membrane assembly; 13: Water production pipeline; 14: Water suction pump; 15: Sewage discharge pipe; 16: Third valve; 17: Gas pump; 18: Second valve.

DETAILED DESCRIPTION

Embodiment I

The present embodiment provides a washing machine, as shown in FIG. 1, which includes a washing drum 1. The washing drum 1 is provided with a clear water inlet, a water outlet and a water returning port. The clear water inlet is connected with a water inlet pipe 2. A first valve 3 is arranged on the water inlet pipe 2. The water outlet is connected with a drainage pipe 4. The drainage pipe 4 is connected with a first drainage pump 5 and a second drainage pump 6 which are arranged in parallel. The first drainage pump 5 and the second drainage pump 6 are connected in parallel and then are connected to a pre-filter 8 by a first branch path 7 and are connected to a discharge pipeline 10 of the washing machine by a second branch path 9. A fourth valve 11 is arranged on the second branch path 9. A filter membrane assembly 12 is connected with an upper part of the pre-filter 8 by a pipeline. A filter membrane/membrane filament divides the filter membrane assembly 12 into a first water inlet cavity and a first water filtering cavity. The first water filtering cavity is connected to the water returning port of the washing drum 1 through a water production pipeline 13. A water suction pump 14 is arranged on the water production pipeline 13. The first water inlet cavity has a water inlet and a sewage outlet. The water inlet is connected with the pre-filter 8, i.e., the pre-filter 8 is arranged on an upstream pipeline of the filter membrane assembly 12. The sewage outlet is connected to the discharge pipeline 10 of the washing machine by a sewage discharge pipe 15. A third valve 16 is arranged on a sewage discharge pipe 15.

The first drainage pump 5 is configured to pump water in the washing drum 1 to the pre-filter 8 and the filter membrane assembly 12 for filtration. A mounting position of the first drainage pump 5 should ensure that a water level in the first water inlet cavity is not higher than a lower edge of the sewage outlet, so as to prevent drainage of excessive washing water/rinsing water. Since the first drainage pump 5 is a low-lift water pump, water in the filter membrane assembly 12 moves continuously during filtration, so as to scour pollutants on a surface of the filter membrane/membrane filament, reduce accumulation of the pollutants, effectively prevent blockage of the surface of the filter membrane/membrane filament, and achieve low noise. In addition, a water surface in the filter membrane assembly 12 continuously fluctuates so that sewage in the first water inlet cavity can be continuously overflowed from the sewage outlet.

A lift of the second drainage pump 6 is greater than a lift of the first drainage pump 5 so that water in the first water inlet cavity of the filter membrane assembly 12 is pumped into the sewage outlet and is discharged from the sewage outlet.

A permeable and airtight filter membrane/membrane filament is arranged inside the filter membrane assembly 12. Optionally, the filter membrane assembly 12 is an ultrafiltration membrane assembly. Since the filter membrane/membrane filament of the filter membrane assembly 12 has a permeable and airtight property, after water to be filtered enters the first water inlet cavity of the filter membrane assembly 12, the water can penetrate through the filter membrane/membrane filament and enter the first water filtering cavity, and then water (i.e., produced water) in the first water filtering cavity is sucked into the water production pipeline 13 of the filter membrane assembly 12 by the water suction pump 14; the produced water is returned to the washing drum 1; and impurities in the water to be filtered are captured by the membrane filament or the surface of the filter membrane/membrane filament.

A filter mesh of the pre-filter 8 divides an internal accommodating cavity of the pre-filter 8 into a second water inlet cavity and a second water filtering cavity located above the second water inlet cavity. The second water inlet cavity is connected with the first branch path 7. The second water filtering cavity is connected with a water inlet of the first water inlet cavity.

Optionally, a gas flow supply apparatus can also be arranged in the washing machine. The gas flow supply apparatus can perform gas washing on the filter membrane assembly 12 and the pre-filter 8. Optionally, the gas flow supply apparatus includes a gas pump 17. Optionally, the gas pump 17 is connected to the second water inlet cavity of the pre-filter 8 by the second valve 18. Since the pre-filter 8 is communicated with the filter membrane assembly 12, the gas flow supply apparatus can realize gas washing of the pre-filter 8 and the filter membrane assembly 12.

In addition, a turbidity sensor can also be arranged in the washing drum 1. Turbidity of rinsing water or washing water in the washing drum 1 is detected by the turbidity sensor. When a detected turbidity is less than a preset value, water in the washing drum 1 is filtered. When the detected turbidity is greater than or equal to the preset value, water in the washing drum 1 is directly discharged from the washing machine after use.

Embodiment II

The present embodiment provides a control method of a washing machine, wherein the washing machine described in the embodiment I is adopted. The control method includes:

In a washing stage, a first valve 3 is turned on; tap water enters a washing drum 1 through a water inlet pipe 2 and a clear water inlet; the washing machine performs a washing program; since washing water is relatively high in turbidity and is not suitable for recycling, after the washing is finished, a third valve 16 is turned off, a fourth valve 11 is turned on, and washing water in the washing drum 1 is discharged from the washing machine through a second drainage pump 6, a second branch path 9 and a discharge pipeline 10, and then a circulating rinsing stage is entered.

In the circulating rinsing stage, the first valve 3 is turned on; tap water enters the washing drum 1 through the water inlet pipe 2 and the clear water inlet; the washing machine performs a rinsing program; the second drainage pump 6 and the fourth valve 11 are turned off; the third valve 16 and the first drainage pump 5 are turned on; rinsing water in the washing drum 1 enters the pre-filter 8 through a first branch path 7 under action of the first drainage pump 5 for filtration; rinsing water is filtered by a filter mesh through a second water inlet cavity and then enters a second water filtering cavity; water in the second water filtering cavity enters a first water inlet cavity of a filter membrane assembly 12 and then enters the first water filtering cavity after being filtered by a filter membrane/membrane filament. A water suction pump 14 sucks water in the first water filtering cavity into a water production pipeline 13 and then the water flows back to the washing drum 1 through a water returning port, thereby realizing circulating filtration of the rinsing water. In the circulating process, a water surface in the filter membrane assembly 12 may fluctuate continuously so that sewage in the first water inlet cavity may be continuously overflowed from a sewage outlet and is discharged. In addition, since the first drainage pump 5 is a low-lift water pump, the first drainage pump 5 can only pump water to a lower edge of the sewage outlet so that water in the filter membrane assembly 12 moves continuously during filtration, thereby scouring pollutants on the surface of the filter membrane/membrane filament, achieving effects of reducing an accumulation degree of the pollutants and effectively preventing blockage without gas blowing, and reducing noise of the washing machine.

After the circulating rinsing stage is completed, the filter membrane assembly 12 and the pre-filter 8 are cleaned. Optionally, the pre-filter 8 can be cleaned firstly and then the filter membrane assembly 12 is cleaned. A cleaning step of the filter membrane assembly 12 includes a gas washing and sewage discharging step and a water washing and sewage discharging step of the filter membrane assembly 12. A cleaning step of the pre-filter 8 includes a gas washing and sewage discharging step and a water washing and sewage discharging step of the pre-filter 8.

In the present embodiment, the gas washing and sewage discharging step of the pre-filter 8 is as follows: the first drainage pump 5 is turned off; the fourth valve 11 is turned off; a gas pump 17 is turned on; the gas pump 17 blows gas to a second water inlet cavity of the pre-filter 8 so as to perform gas washing to the pre-filter 8 and separate the pollutants attached to the filter mesh of the pre-filter 8 from the filter mesh; then the fourth valve 11 is turned on; and sewage in the pre-filter 8 is discharged from the washing machine through the second branch path 9 and the discharge pipeline 10. Then, the water washing and sewage discharging step of the pre-filter 8 is performed, and the water washing and sewage discharging step of the pre-filter 8 may include: the third valve 16 is turned off; the second drainage pump 6 is turned on; the second drainage pump 6 pumps water in the washing drum 1 into the pre-filter 8, thereby performing water washing to the pre-filter 8; then, the second drainage pump 6 is turned off; and the sewage after cleaning the pre-filter 8 is discharged from the washing machine by the fourth valve 11.

The gas washing and sewage discharging step of the filter membrane assembly 12 is as follows: the first drainage pump 5 is turned off; the fourth valve 11 is closed; the third valve 16 is turned on; the gas pump 17 is turned on; the gas pump 17 blows gas into the first water inlet cavity of the filter membrane assembly 12 by the pre-filter 8, thereby performing gas washing to the filter membrane assembly 12 and separating the pollutants attached to the filter membrane/membrane filament from the filter membrane/membrane filament; and the gas and the sewage in the first water inlet cavity overflow from the sewage outlet. The water washing and sewage discharging step of the filter membrane assembly 12 is as follows: the second drainage pump 6 is turned on; and the second drainage pump 6 discharges the sewage after gas washing in the filter membrane assembly 12 from the washing machine through the sewage outlet, the sewage discharge pipe 15 and the discharge pipeline 10. The filter membrane assembly 12 can simultaneously perform the water washing and sewage discharging step and the gas washing and sewage discharging step, and can also perform the gas washing and sewage discharging step before the water washing and sewage discharging step.

In addition, the filter membrane assembly 12 and the pre-filter 8 can be cleaned for several times in the circulating rinsing process. After the circulating rinsing process is completed, the filter membrane assembly 12 and the pre-filter 8 can be cleaned repeatedly for multiple times so as to realize thorough cleaning of the filter membrane assembly 12 and the pre-filter 8.

What is claimed is:

1. A washing machine, comprising:
   a filter membrane assembly, which is configured to filter water discharged from a washing drum of the washing machine and comprises separated first water inlet cavity and first water filtering cavity, wherein the first water inlet cavity comprises a water inlet and a sewage outlet;
   a water suction pump, which is arranged on a water production pipeline of the filter membrane assembly and is configured to suck water in the first water filtering cavity to the water production pipeline, so as to return water filtered by the filter membrane assembly to the washing drum of the washing machine for reuse;
   a first drainage pump, which is arranged on a pipeline between the washing drum and a water inlet of the first water inlet cavity and is configured to pump water in the washing drum to the first water inlet cavity and ensure that a water level in the first water inlet cavity is not higher than a lower edge of the sewage outlet; and
   a gas flow supply apparatus, which is configured to perform gas washing to the filter membrane assembly, wherein the first drainage pump is in an off state when the gas flow supply apparatus is operated.

2. The washing machine according to claim 1, further comprising:
   a second drainage pump, which is arranged in parallel with the first drainage pump; wherein a lift of the second drainage pump is greater than a lift of the first drainage pump;
   wherein the second drainage pump is configured to pump water in the washing drum to a discharge pipeline of the washing machine so as to discharge the water to outside of the washing machine, or is configured to pump water in the washing drum to the filter membrane assembly for washing the filter membrane assembly, and discharge water after washing from the discharge pipeline of the washing machine to outside of the washing machine through the sewage outlet of the first water inlet cavity.

3. The washing machine according to claim 2, further comprising a pre-filter, which is arranged on an upstream pipeline of the filter membrane assembly and is configured to filter water from the washing drum before the filter membrane assembly;
   wherein the pre-filter is located below the filter membrane assembly; and a filter mesh of the pre-filter divides an internal accommodating cavity of the pre-filter into a second water inlet cavity and a second water filtering cavity which is located above the second water inlet cavity; and
   a gas outlet of the gas flow supply apparatus is connected to the second water inlet cavity.

4. The washing machine according to claim 2, wherein a turbidity sensor is arranged in the washing drum, and is configured to detect turbidity of rinsing water or washing water in the washing drum, filter water in the washing drum when a detected turbidity is less than a preset value; and directly discharge water in the washing drum from the washing machine after use when a detected turbidity is greater than or equal to the preset value.

5. The washing machine according to claim 1, wherein a turbidity sensor is arranged in the washing drum, and is configured to detect turbidity of rinsing water or washing water in the washing drum, filter water in the washing drum when a detected turbidity is less than a preset value; and directly discharge water in the washing drum from the washing machine after use when a detected turbidity is greater than or equal to the preset value.

* * * * *